United States Patent [19]

Douglas et al.

[11] 4,075,404

[45] Feb. 21, 1978

[54] COPOLYMERS OF ALPHA-METHYLSTYRENE AND STYRENE AND USES THEREOF

[75] Inventors: Paul S. Douglas, Jefferson Township, Fayette County; Anargiros Pete Patellis, Rostraver Township, Westmoreland County; Walter A. Vredenburgh, Pleasant Hills, all of Pa.

[73] Assignee: Hercules Incorporated, Wilmington, Del.

[21] Appl. No.: 635,482

[22] Filed: Nov. 25, 1975

Related U.S. Application Data

[62] Division of Ser. No. 333,215, Feb. 16, 1973, Pat. No. 3,932,332.

[51] Int. Cl.² ............... C08F 4/14; C08F 212/12
[52] U.S. Cl. ........................... 526/237; 526/347
[58] Field of Search ..................... 526/347, 237

[56] References Cited

U.S. PATENT DOCUMENTS

| | | | |
|---|---|---|---|
| 2,556,459 | 6/1951 | Wesp | 526/347 |
| 2,958,671 | 11/1960 | Keskkula et al. | 260/45.5 |
| 3,000,868 | 9/1961 | Powers | 526/347 |
| 3,090,767 | 5/1963 | Colgan et al. | 260/45.5 |
| 3,499,877 | 3/1970 | Arnold et al. | 526/347 |
| 3,725,506 | 4/1973 | Bolte et al. | 526/347 |
| 3,784,530 | 1/1974 | Osborn et al. | 260/80.7 |
| 3,846,352 | 11/1974 | Bullard et al. | 260/5 |
| 3,932,332 | 1/1976 | Douglas et al. | 526/347 |
| 3,956,250 | 5/1976 | Campbell et al. | 526/347 |

FOREIGN PATENT DOCUMENTS

| | | |
|---|---|---|
| 1,214,366 | 4/1960 | France. |
| 1,903,903 | 9/1970 | Germany. |
| 1,172,426 | 12/1964 | Germany. |
| 1,037,707 | 8/1966 | United Kingdom. |
| 858,252 | 1/1961 | United Kingdom. |

OTHER PUBLICATIONS

Abstract of British Specification 1,309,955.

*Primary Examiner*—Alan Holler
*Attorney, Agent, or Firm*—Charles L. Board

[57] ABSTRACT

This specification discloses manufacture of copolymers of alpha-methylstyrene and styrene in which the alpha-methylstyrene may range from about 50 to 90% and the softening point may range from about 60° to 100° C. The copolymers have especial utility with elastomers to produce pressure sensitive adhesives and the like, and in hot melt coatings.

6 Claims, No Drawings

COPOLYMERS OF ALPHA-METHYLSTYRENE AND STYRENE AND USES THEREOF

This is a division of application Ser. No. 333,215, filed Feb. 16, 1973, now U.S. Pat. No. 3,932,332.

This invention relates to the manufacture of copolymers of alpha-methylstyrene and styrene and uses thereof. More particularly it relates to the use of such polymers as tackifiers for synthetic rubbers, as constituents of hot melt coatings and adhesives, and other uses.

The preparation and use of a variety of resins based upon a styrene monomer is well known. We have discovered that copolymers of alpha-methylstyrene and styrene prepared under controlled conditions exhibit special and unexpected usefulness in a number of different areas. Such polymers impart good tack to styrene-butadiene rubbers thereby producing good pressure sensitive adhesives, mastics, caulks, and sealants. The polymers of the invention may also be used to impart tack to elastomeric block copolymers of styrene and isoprene and to polychloroprene elastomers to produce adhesives. Some, but not all of the polymers, are also effective as constituents for hot melt coatings and adhesives where they exhibit good compatibility and low cloud point when blended into the mix. The polymers are also useful as additives to paint and chemical coatings.

We prepare a copolymer of alpha-methylstyrene and styrene ranging from about 50% alpha-methylstyrene and 50% styrene to about 90% alpha-methylstyrene and 10% styrene. We blend the monomers in a solvent and react them in the presence of a Friedel-Crafts catalyst. We carefully control the temperature of the reacton mixture and maintain the temperature within close limits throughout the time of reaction. We react the mixture at a selected temperature within a range of about 15° C to 45° C. Lime is then added to the reaction mixture to neutralize the catalyst. After filtration of the catalyst residue, the solvent is stripped from the resin. The resin so produced has a softening point (ring and ball) ranging from about 70° C to 100° C. Preferably we prepare a polymer of about 70% to 75% alpha-methylstyrene and 30% to 25% styrene. We prefer to react the monomers at a selected temperature within a range from about 15° C to about 33° C, and we prefer to maintain the reaction temperature within limits of ± 2° C. Under some circumstances we may react the monomers at a selected temperature within a range of 23° C to 33° C and we may maintain the reaction temperature within limits of ± 1° C. We prefer to use boron trifluoride ($BF_3$) as a catalyst.

The resin is useful as an additive for styrene-butadiene rubber (SBR), block copolymers of styrene and isoprene, and polychloroprene. The resin imparts tack to those elastomers. The compositions of resin and elastomer are suitable for use as pressure sensitive adhesives, mastics, sealants, and caulks.

Hot melt compounds are commonly used for sealing and as adhesives. Such compounds are frequently used to seal corrugated shipping containers and the like and they are especially useful because they are thermoplastic. They may be applied hot to corrugated paper but will almost immediately set because of quick loss of heat. The compounds do not include solvents which could cause fumes or degradation of the corrugated paper. We prefer to employ in hot melt compounds one of our resins having a softening point (ring and ball) from about 70° C to about 85° C. Such resins exhibit exceptional compatability with paraffin wax and ethylene vinyl acetate commonly used in hot melt compositions and exhibit desirably low cloud points. In certain hot melt formulations the resin of the invention having a softening point of about 100° C has utility.

The invention may be illustrated by reference to several exemplary resins manufactured and used in accordance with the invention.

EXAMPLE 1

A 500 milliliter three neck flask is equipped with a stirrer, thermometer, gas outlet tube, and a straight pipe dip tube. The flask is charged with 70 grams of alpha-methylstyrene 30 grams of styrene and 100 grams of Solvesso 100. The mixture is cooled to 15° C. $BF_3$ gas is introduced into the mixture at a flow rate of approximately 0.1 gram per minute from time to time over a period of 12 minutes while maintaining a temperature in the reaction mixture of 15° C to 20° C through use of a dry ice alcohol bath at −15° C. After reaction, the mixture turns to a pale yellow color and is allowed to soak at 15° C to 20° C for 30 minutes. Thereafter the mixture is quenched with approximately 5 grams of lime. Twenty grams of Filter Aid is added and the mixture heated to approximately 55° C. The mixture is then vacuum filtered through Filter Aid. One hundred milliliters of xylol is used to rinse the flask and then to wash the filter cake. The resin oil is transferred to a single neck round bottom flask fitted with a cork containing a gas dip tube thermometer and an exhaust tube. The mixture is stripped of solvent at a pot temperature of 210° C under nitrogen and is then steam stripped to a maximum pot temperature of 225° C.

The resin thus produced has the following properties:

| | |
|---|---|
| Softening Point (R&B) | 98° C |
| OMS* Cloud Point | 95° C |
| Nujol Cloud Point | 20° C |
| 60% Solution Viscosity (In Toluene) | 0.9 Stokes |
| 70% Solution Viscosity (In Toluene) | 6.6 stokes |

*odorless mineral spirits

EXAMPLE 2

Seventy-five grams of alpha-methylstyrene and 25 grams of styrene are charged to a flask with 200 grams of Solvesso 100. The procedure is similar to that of Example 1. $BF_3$ is added from time to time over a 10 minute period while maintaining a temperature in the reaction mixture of 25 ± 2° C. After saturation of the mixture by $BF_3$ is noted, the mixture is allowed to soak for 30 minutes at 25 ± 2° C. The resin thus produced has the following properties:

| | |
|---|---|
| Softening Point (R&B) | 87° C |
| Color | Water White |
| OMS Cloud Point | 33° C |
| Nujol Cloud Point | 4° C |
| 70% Solution Viscosity (In Toluene) | 2.6 Stokes |

EXAMPLE 3

A mixture of 375 grams of alpha-methylstyrene, 125 grams of styrene and 1,000 grams of Solvesso 100 is charged to a flask. The procedure generally follows that of Examples 1 and 2 except that the time for saturation with BF$_3$ is 21 minutes. The reaction temperature is maintained at 31 ± 1° C and the mixture is allowed to soak for 1 hour at 31 ± 1° C following saturation.

The properties of the resin so produced are as follows:

| | |
|---|---|
| Softening Point (R&B) | 70° C |
| Color | Water White |
| OMS Cloud Point | 5° C |
| Nujol Cloud Point | Clear at 0° C |
| 70% Solution Viscosity (In Toluene) | 1.7 Stokes |

It is apparent that the polymerization temperature is related to the softening point of the resin, the softening point decreasing as the polymerization temperature is raised. It is believed that close and accurate control of the polymerization temperature produces a polymer having a generally uniform molecular weight. It is thought that the effectiveness of the resin may be due, at least in part, to its particular molecular weight distribution.

The usefulness of the resins may be shown by reference to test data. It has been found that the resins of the invention impart good tack to SBR, Neoprene AC, and Kraton 1107. Several resins prepared in accordance with the general procedures set forth in Examples 1, 2, and 3 were separately blended with SBR in varying proportions. The mixtures of resin and rubber were then applied to film, and tack data on tapes cut from this film were obtained following standard test procedures as shown in Tables 1, 2, and 3.

TABLE 1

Tack Data - Pressure Sensitive Tapes - Different Resins And SBR in Varying Proportions

| | | Resin Typical of Ex. 1 | Resin Typical of Ex. 2 | Resin Typical of Ex. 3 |
|---|---|---|---|---|
| 30% Resin/ 70% SBR | | | | |
| Polyken | Gms. | | 700 | 600 |
| 180° peel | Ozs. | | 46 | 52 |
| 90° Quick Stick | Ozs. | | 5 | 15 |
| 178° Hold to Steel | Mins. | | 1250 | 920 |
| 40% Resin/ 60% SBR | | | | |
| Polyken | Gms. | 980 | 875 | 890 |
| 180° Peel | Ozs. | 50 | 48 | 56 |
| 90° Quick Stick | Ozs. | 8 | 6 | 17 |
| 178° Hold to Steel | Mins. | >1440 | 570 | 455 |
| 50% Resin/ 50% Sbr | | | | |
| Polyken | Gms. | | 1320 | 1150 |
| 180° Peel | Ozs. | | 56 | 61 |
| 90° Quick Stick | Ozs. | | 16 | 28 |
| 178° Hold to Steel | Mins. | | 425 | 260 |

TABLE 2

Tack Data - Pressure Sensitive Tapes - 50% Resin Typical of Example 2 and 50% Neoprene AC - soft

| | | |
|---|---|---|
| Polyken | gms. | 2130 |
| 180° Peel | ozs. | 100 |
| 90° Quick Stick | ozs. | Harsh |
| 178° Hold to Steel | mins. | >8000 |

TABLE 3

Tack Data - Pressure Sensitive Tapes - Resins Typical of Examples 2 and 3 And Kraton 1107

| | | Resin 2 | Resin 3 |
|---|---|---|---|
| 30% resin/70% polymer | | | |
| Polyken | gms. | 1220 | 980 |
| 180° Peel | ozs. | 50 | 40 |
| 90° Quick Stick | ozs. | 38 | 28 |
| 178° Hold to Steel | mins. | >3000 | >3000 |
| 40% resin/60% polymer | | | |
| Polyken | gms. | 1520 | 1220 |
| 180° Peel | ozs. | 74 | 58 |
| 90° Quick Stick | ozs. | 36 | 48 |
| 178° Hold to Steel | mins. | >3000 | >3000 |
| 50% resin/50% polymer | | | |
| Polyken | gms. | No Tack | 1500 |
| 180° Peel | ozs. | " | 80 |
| 90° Quick Stick | ozs. | " | 56 |
| 178° Hold to Steel | mins. | " | >3000 |
| 60% resin/40% polymer | | | |
| Polyken | gms. | No Tack | 280 |
| 180° Peel | ozs. | " | 90 |
| 90° Quick Stick | ozs. | " | 0 |
| 178° Hold to Steel | mins. | " | >3000 |
| 70% resin/30% polymer | | | |
| Polyken | gms. | No Tack | No Tack |
| 180° Peel | ozs. | " | " |
| 90° Quick Stick | ozs. | " | " |
| 178° Hold to Steel | mins. | " | " |

Certain of the resins are effective in hot melt coatings and adhesives. Clouding of the hot melt composition indicates a phase separation and, consequently, a loss of solubility. Accordingly, it is desirable in such compositions that the cloud point be low. The freezing point of parrafin wax, a major constituent of many hot melt coatings, is about 154 to 158° F and the cloud point of such hot melt compositions is usually preferably near that temperature. However, there are applications, such as in high hot strength coatings or adhesives, in which complete solubility is not desirable.

A common hot melt composition comprises ethylene vinyl acetate and wax. Several resins exemplary of Examples 2 and 3, identified as resins 2 and 3, respectively, were blended with wax and ethylene vinyl acetate. The properties were maintained constant, but the amount of vinyl acetate in the ethylene vinyl acetate was varied and cloud point determinations were made as shown in Table 4. The data show that there is a wide range of vinyl acetate content in which the cloud point is close to the freezing point of the wax.

Table 4

Cloud Point Determinations In Degrees F. For Blends Of 20% Ethylene Vinyl Acetates, 20% Resin, and 60% Wax With Varying Ratios Of Ethylene And Vinyl Acetate In The Copolymer

| | % Vinyl acetate (in ethylene vinyl acetate) | | | | |
|---|---|---|---|---|---|
| | 18 | 25 | 28 | 33 | 40 |
| Resin 2 | 194 | 169 | 158 | 169 | 255 |
| Resin 3 | 158 | 158 | 154 | 162 | 248 |

Exemplary resins were blended with several waxes in different proportions, and the cloud points were determined with the results shown in Table 5.

Table 5

Cloud Point Determinations in Degrees F. For Blends of Wax and Resin in Varying Proportions

| | % Wax | | | |
|---|---|---|---|---|
| | 30 (1) | 50 (1) | 70 (1) | 50 (2) |
| Resin 2 | 158 | 172 | 194 | 226 |

Table 5-continued

| Cloud Point Determinations in Degrees F. For Blends of Wax and Resin in Varying Proportions | | | | |
|---|---|---|---|---|
| | % Wax | | | |
| | 30 (1) | 50 (1) | 70 (1) | 50 (2) |
| Resin 3 | 154 | 153 | 156 | 180 |

(1) Atlantic 1116, manufactured by Atlantic Refining Co.
(2) Multiwax 180-M, manufactured by Sonneborn Div. of Witco Chemical Corp.

Exemplary resins were blended with wax and with ethylene vinyl acetate (72% ethylene and 28% vinyl acetate) in varying proportions and cloud point determinations were made as shown in Table 6. Again, low cloud point was found over a broad range of proportions.

Table 6

| Cloud Point Determinations In Degrees F For Blends of Wax, Resin, and Ethylene Vinyl Acetate (72% Ethylene and 28% Vinyl Acetate) in Varying Proportions | | | |
|---|---|---|---|
| EVA | 15% | 20% | 25% |
| Resin | 15 | 20 | 25 |
| Wax | 70 | 60 | 50 |
| Resin 2 | 172 | 158 | 158 |
| Resin 3 | 158 | 154 | 158 |

Exemplary resins were blended with ethylene vinyl acetate (72% ethylene and 28% vinyl acetate) and wax with the amounts of wax and resin being varied. Cloud point determinations were made as shown in Table 7.

Table 7

| Cloud Point Determinations In Degrees F. For Blends of Wax, Resin, and Ethylene Vinyl Acetate (78% Ethylene and 28% Vinyl Acetate) in Varying Proportions | | | | | |
|---|---|---|---|---|---|
| EVA | 20% | 20% | 20% | 20% | 20% |
| Resin | 10 | 20 | 30 | 40 | 50 |
| Wax | 70 | 60 | 50 | 40 | 30 |
| Resin 2 | 158 | 158 | 169 | 169 | 172 |
| Resin 3 | 158 | 154 | 154 | 156 | 158 |

Several hot melt compositions were prepared including resins exemplary of Examples 1, 2 and 3. Those compositions were then tested for viscosity, effectiveness in adhering two sheets of corrugated cardboard, and softening temperature. The data are set forth in Table 8.

Table 8

| Blend | | | | | |
|---|---|---|---|---|---|
| Resin 1 | — | — | — | — | 37.5% |
| Resin 3 | 37.5% | 37.5% | — | — | — |
| Multiwax 180-M(1) | 24.4 | 24.4 | 24.4 | 24.4 | 24.4 |
| Resin 2 | — | — | 37.5 | 37.5 | — |
| Elvax 460(2) | 24.8 | 24.8 | 24.8 | 24.8 | 24.8 |
| Polyethylene AC-8(3) | — | — | 13.1 | — | 13.1 |
| Polywax 1000(4) | — | 13.1 | — | 13.1 | — |
| BHT(5) | 0.25 | 0.25 | 0.25 | 0.25 | 0.2 |
| Viscosity | | | | | |
| cps a 250° F | 18,000 | 12,000 | 29,750 | 14,600 | — |
| cps a 275° F | 10,900 | 7,300 | 12,500 | 8,300 | — |
| cps a 300° F | 7,000 | 4,675 | 7,500 | 5,300 | 13,700 |
| cps a 325° F | 4,700 | 3,200 | 5,000 | 3,550 | — |
| cps a 350° F | 3,250 | 2,250 | 3,450 | 2,450 | 5,070 |
| Corrugated Test | | | | | |
| a −20° F | F.T. (6) | F.T. | F.T. | F.T. | F.T. |
| a Ambient Temp. | F.T. | F.T. | F.T. | F.T. | F.T. |
| a 140° F | F.T. | F.T. | F.T. | F.T. | F.T. |
| a 150° F | F.T. | F.T. | F.T. | F.T. | F.T. |
| a 160° F | F.T. | F.T. | F.T. | F.T. | F.T. |
| a 165° F | Cohesive Failure | F.T. | Borderline | Borderline | — |
| B & R Softening Point | 113° C | 111° C | 111° C | 110° C | — |

(1) Microcrystalline wax, Sonneborn Div. of Witco Chemical Co.
(2) Ethylene vinyl acetate (18% vinyl acetate) E.I. DuPont deNemours
(3) Allied Chemical Corp.
(4) Synthetic Paraffin Wix, Bareco Corp.
(5) Butylated Hydroxytoluene.
(6) Fiber Tear We have disclosed certain preferred embodiments of our preferred resins and uses thereof. It is to be understood, however, that we do not limit ourselves thereto and that the invention may be otherwise variously practiced within the scope of the following claims.

We claim:

1. A copolymer consisting of α-methylstyrene and styrene as the sole monomers produced by copolymerization of, by weight, from about 90 parts to about 50 parts α-methylstyrene and from about 50 parts to about 10 parts styrene at a temperature range from about 15° C. to about 45° C. and in the presence of a Friedel-Crafts catalyst, said copolymer having a softening point (ring and ball) of under 100° C.

2. A copolymer according to claim 1 which has a softening point (ring and ball) of between about 70° C. and about 85° C.

3. A copolymer according to claim 1 in which copolymerization takes place at a temperature in the range of about 23° C. to about 33° C.

4. A copolymer consisting of α-methylstyrene and styrene as the sole monomers produced by copolymerization of, by weight, from about 75 parts to about 70 parts α-methylstyrene and from about 25 parts to about 30 parts styrene at a temperature range from about 15° C. to about 45° C. and in the presence of a Friedel-Crafts catalyst, said copolymer having a softening point (ring and ball) of under 100° C.

5. A copolymer according to claim 4 which has a softening point (ring and ball) of between about 70° C. and about 85° C.

6. A copolymer according to claim 4 in which copolymerization takes place at a temperature in the range of about 23° C. to about 33° C.

* * * * *